(12) United States Patent
Sorin et al.

(10) Patent No.: US 7,944,960 B2
(45) Date of Patent: May 17, 2011

(54) INTEGRATION OF LASER SOURCES AND DETECTORS FOR A PASSIVE OPTICAL NETWORK

(75) Inventors: Wayne V. Sorin, Mountain View, CA (US); Ben J. Vakoc, Cambridge, MA (US)

(73) Assignee: Novera Optics, Inc., Santa Clara, CA (US)

( * ) Notice: Subject to any disclaimer, the term of this patent is extended or adjusted under 35 U.S.C. 154(b) by 0 days.

(21) Appl. No.: 12/564,011

(22) Filed: Sep. 21, 2009

(65) Prior Publication Data

US 2010/0014865 A1 Jan. 21, 2010

Related U.S. Application Data

(62) Division of application No. 11/983,720, filed on Nov. 9, 2007, now Pat. No. 7,593,444, which is a division of application No. 10/741,134, filed on Dec. 19, 2003, now Pat. No. 7,313,157.

(51) Int. Cl.
*H01S 5/00* (2006.01)
(52) U.S. Cl. .................................. 372/50.12; 372/50.11
(58) Field of Classification Search ................. 372/50.1, 372/50.11, 50.12
See application file for complete search history.

(56) References Cited

U.S. PATENT DOCUMENTS

| | | |
|---|---|---|
| 4,563,087 A | 1/1986 | Bourbin et al. |
| 5,202,780 A | 4/1993 | Fussanger |
| 5,221,983 A | 6/1993 | Wagner |
| 5,251,001 A | 10/1993 | Dave et al. |
| 5,276,543 A | 1/1994 | Olshansky |
| 5,321,541 A | 6/1994 | Cohen |
| 5,347,525 A | 9/1994 | Faris |
| 5,418,183 A | 5/1995 | Joyner et al. |
| 5,436,760 A | 7/1995 | Nakabayashi |
| 5,440,417 A | 8/1995 | Chung et al. |
| 5,550,666 A | 8/1996 | Zirngibl |
| 5,625,478 A | 4/1997 | Doerr et al. |
| 5,646,774 A | 7/1997 | Takara et al. |
| 5,661,585 A | 8/1997 | Feldman et al. |
| 5,694,234 A | 12/1997 | Darcie et al. |
| 5,773,345 A | 6/1998 | Ota |
| 5,793,512 A | 8/1998 | Ryu |
| 5,796,502 A | 8/1998 | Haller, Jr. |
| 5,812,572 A | 9/1998 | King et al. |

(Continued)

FOREIGN PATENT DOCUMENTS

EP 1124296 8/2001

(Continued)

OTHER PUBLICATIONS

B. Pezeshki et al., "12 Element Multi-wavelength DFB Arrays for Widely Tunable Laser Modules", OFC 2002, pp. 711-712.

(Continued)

*Primary Examiner* — Armando Rodriguez
(74) *Attorney, Agent, or Firm* — Blakely, Sokoloff, Taylor & Zafman LLP (57) ABSTRACT

Various methods and apparatuses are described in which an array of optical gain mediums capable of lasing are contained in a single integral unit. The array may contain four or more optical gain mediums capable of lasing. Each optical gain medium capable of lasing supplies a separate optical signal containing a band of wavelengths different than the other optical gain mediums capable of lasing in the array to a first multiplexer/demultiplexer. A connection for an output fiber exists to route an optical signal to and from a passive optical network.

9 Claims, 6 Drawing Sheets

U.S. PATENT DOCUMENTS

| | | | |
|---|---|---|---|
| 5,835,517 | A | 11/1998 | Jayaraman et al. |
| 5,880,865 | A | 3/1999 | Lu et al. |
| 5,894,247 | A | 4/1999 | Yoshida et al. |
| 5,907,417 | A | 5/1999 | Darcie et al. |
| RE36,471 | E | 12/1999 | Cohen |
| 6,034,799 | A | 3/2000 | Hansen |
| 6,097,523 | A | 8/2000 | Boot |
| 6,134,037 | A | 10/2000 | Shabeer et al. |
| 6,134,250 | A | 10/2000 | Koren et al. |
| 6,137,611 | A | 10/2000 | Boivin et al. |
| 6,192,170 | B1 | 2/2001 | Komatsu |
| 6,304,350 | B1 | 10/2001 | Doerr et al. |
| 6,310,720 | B1 | 10/2001 | Walker et al. |
| 6,498,871 | B1 | 12/2002 | Kuboki |
| 6,597,482 | B1 | 7/2003 | Chung et al. |
| 6,603,599 | B1 | 8/2003 | Wang et al. |
| 6,650,840 | B2 | 11/2003 | Feldman |
| 6,674,969 | B1 | 1/2004 | Ogusu |
| 6,868,236 | B2 | 3/2005 | Wiltsey et al. |
| 6,888,856 | B2 | 5/2005 | Green et al. |
| 6,941,074 | B2 | 9/2005 | Nakamura et al. |
| 7,006,719 | B2 | 2/2006 | Joyner et al. |
| 7,075,712 | B2 | 7/2006 | Kinoshita et al. |
| 7,106,974 | B2 | 9/2006 | Lee et al. |
| 7,171,123 | B2 | 1/2007 | Lee et al. |
| 7,327,957 | B2 | 2/2008 | Lee et al. |
| 7,349,631 | B2 | 3/2008 | Lee et al. |
| 7,403,718 | B2 | 7/2008 | Matthews et al. |
| 2001/0004290 | A1 | 6/2001 | Lee et al. |
| 2001/0013962 | A1 | 8/2001 | Li et al. |
| 2002/0067526 | A1 | 6/2002 | Park et al. |
| 2002/0097768 | A1 | 7/2002 | Thorton |
| 2002/0126345 | A1 | 9/2002 | Green et al. |
| 2003/0095736 | A1 | 5/2003 | Kish, Jr. et al. |
| 2003/0142978 | A1 | 7/2003 | Lee et al. |
| 2003/0165006 | A1 | 9/2003 | Stephens et al. |
| 2003/0206740 | A1 | 11/2003 | Lee et al. |
| 2003/0223672 | A1 | 12/2003 | Joyner et al. |
| 2004/0033004 | A1 | 2/2004 | Welch et al. |
| 2004/0175188 | A1 | 9/2004 | Bellemare et al. |
| 2005/0259989 | A1 | 11/2005 | Sorin et al. |
| 2005/0286895 | A1 | 12/2005 | Lee et al. |
| 2006/0263090 | A1 | 11/2006 | Lee et al. |

FOREIGN PATENT DOCUMENTS

| | | |
|---|---|---|
| EP | 1195867 | 4/2002 |
| JP | 2000-174397 | 6/2000 |
| JP | 2002-270949 | 9/2002 |
| JP | 2003-14963 | 1/2003 |
| JP | 2001-203643 | 7/2007 |
| KR | 00-33946 | 6/2000 |
| KR | 00-39036 | 7/2000 |
| KR | 10-2001-0063062 | 7/2001 |
| KR | 01-93921 | 10/2001 |
| KR | 10-2002-0003318 | 1/2002 |
| KR | 0325687 | 4/2002 |
| KR | 10-2003-0063085 | 7/2003 |
| KR | 10-2003-0065632 | 8/2003 |
| KR | 10-2003-0086223 | 11/2003 |
| KR | 0454887 | 10/2004 |
| KR | 0496710 | 6/2005 |
| KR | 0515259 | 9/2005 |
| WO | WO 98/32196 | 7/1998 |
| WO | WO 99/37002 | 7/1999 |
| WO | WO 99/59010 | 11/1999 |
| WO | WO 03/032547 | 4/2003 |
| WO | WO 03/065621 | 8/2003 |
| WO | WO 03/102659 | 12/2003 |
| WO | WO 03/107057 | 12/2003 |
| WO | WO 2004/107628 | 12/2004 |
| WO | WO 2005/069516 | 7/2005 |
| WO | WO 2005/099148 | 10/2005 |
| WO | WO 2006/005981 | 1/2006 |

OTHER PUBLICATIONS

Chang-Hasnain et al., "Integrated external cavity quantum well laser array using single epitaxial growth on a patterned substrate," Applied Physics Letters, vol. 56, No. 5, Jan. 1990.

H. Takahashi, et al., "Transmission characteristics of arrayed-waveguide N×N wavelenth multiplexer," IEEE Photonic Technology Letters, vol. 13, No. 3, pp. 447-455 (Mar. 1995).

Hyun Deok Kim, et al., "A Low-Cost WDM Source with an ASE Injected Fabry-Perot Semiconductor Laser," XP000968561, IEEE Photonics Technology Letters, vol. 12, No. 8, pp. 1067-1069 (Aug. 2000).

International Preliminary Report on Patentatbility dated Jun. 29, 2006 for PCT/US2004/031407 filed Sep. 23, 2004.

International Telecommunication Union (ITU), ITU-T, G.983.1. Series G: Transmission Systems and Media Digital Systems and Networks, Digital transmission systems—Digital sections and digital line system—Optical line systems for local and access networks, Broadband optical access systems based on Passive Optical Networks (PON) (Oct. 1998).

J. Heanue et al., "Widely Tunable Laser Module using DFB Array and MEMS Selection with Internal Wavelength Locker", OFC 2003/vol. 1, pp. 82-83.

Jae-Sung Lee, "Signal-to-Noise Ratio Measurement of a 2.5-Gb/s Spectrum-Sliced Incoherent Light Channel," IEEE Photonics Technology Letters, vol. 9, No. 1, pp. 94-96 (Jan. 1997).

PCT Notification of Transmittal of The International Search Report and the Written Opinion of the International Searching Authority or The Declaration for PCT Counterpart Application No. PCT/US2004/031407 Containing International Search Report (Feb. 9, 2005).

Robert D. Feldman, et al., "An Evaluation of Architectures Incorporating Wavelength Division Multiplexing for Broad-Band Fiber Access," Journal of Lightwave Technologies, vol. 16, No. 9, pp. 1546-1559 (Sep. 1998).

Zirngibl, M., et al., "*An 18-Channel Multifrequency Laser*", IEEE Photonics Technology Letters, vol. 8. No. 7, Jul. 1996, pp. 870-872 (3 pages).

Zah, C. et al., "Amplifiers with Angled Facets, Fabrication and Performance of 1.5MUM GAINASP Traveling-Wave Laser," Electonics Letters, IEE Stevenage, GB, vol. 23, No. 19, Sep. 10, 1987, pp. 990-992, XP000710298, ISSN: 0013-5194.

INTEGRATION OF LASER SOURCES AND DETECTORS FOR A PASSIVE OPTICAL NETWORK

CROSS REFERENCE TO RELATED APPLICATIONS

The present application claims priority from and is a divisional application of U.S. patent application Ser. No. 11/983,720, filed Nov. 9, 2007 now U.S. Pat. No. 7,593,444 which is a divisional application of U.S. patent application Ser. No. 10/741,134, filed Dec. 19, 2003, which has issued as U.S. Pat. No. 7,313,157.

FIELD

Embodiments of the invention generally relate to optical networks. More particularly, an aspect of an embodiment of the invention relates to array of optical gain mediums capable of lasing contained in a single integral unit.

BACKGROUND

Fiber optic systems typically transmit optical signals back and forth between a central office to a multitude of residential and business locations. Each residential or business location may be assigned a narrow bandwidth of wavelengths or channel within an overall optical signal to communicate with and from the central office. As the number of subscribers using that fiber optical system increases, the amount of components in the central office may increase to transmit and receive optical signals from those subscribers.

SUMMARY

Various methods and apparatuses are described in which an array of optical gain mediums capable of lasing contained in a single integral unit. The array may contain four or more optical gain mediums capable of lasing. Each optical gain medium capable of lasing supplies a separate optical signal containing a band of wavelengths different than the other optical gain mediums capable of lasing in the array to a first multiplexer/demultiplexer. A connection for an output fiber exists to route an optical signal to and from a passive optical network.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which.

DETAILED DISCUSSION

In general, various methods and apparatuses are described in which an array of optical gain mediums capable of lasing and an array of optical receivers are contained in a single integral unit. The array may contain four or more optical gain mediums capable of lasing. Each optical gain medium capable of lasing supplies a separate optical signal containing a band of wavelengths different than the other optical gain mediums capable of lasing in the array to a first multiplexer/demultiplexer. Similarly, a second multiplexer/demultiplexer may route optical signals to the array of optical receivers. A connection for an output fiber exists to route an optical signal to and from a passive optical network.

Figure 1:
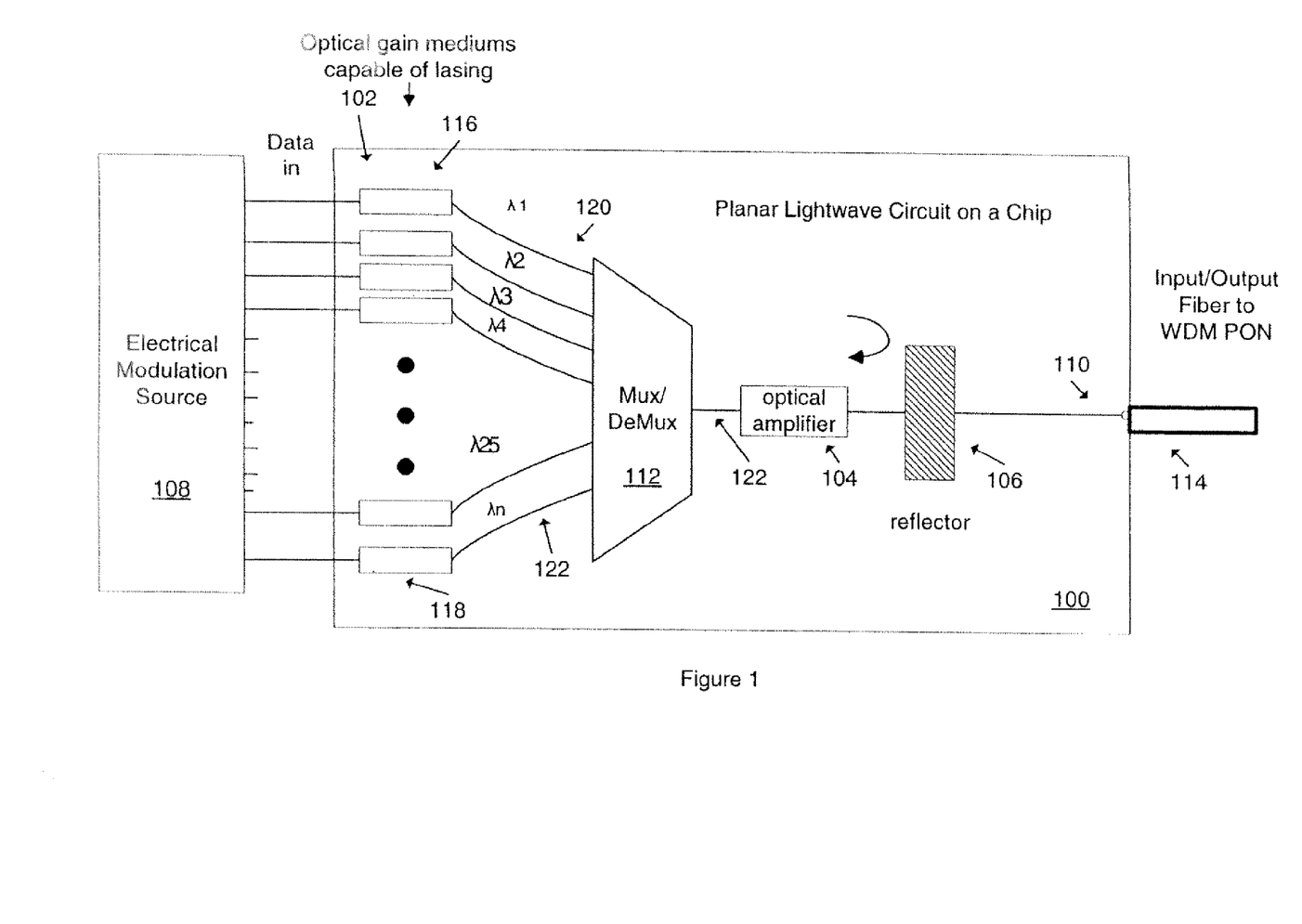
FIG. 1 illustrates a block diagram of an embodiment of an array of multiple wavelength optical gain mediums capable of lasing.

FIG. 1 illustrates a block diagram of an embodiment of an array of multiple wavelength optical gain mediums capable of lasing. The planar lightwave circuit 100 may contain an array of four more optical gain mediums capable of lasing 102, such as lasers, a multiplexer/demultiplexer 112, an optical amplifier 104, a broadband wavelength reflector 106, an electrical modulation source 108, a connection 110 to an output fiber, and an output fiber 114 going to a wavelength-division-multiplexed passive optical network.

Multiple optical gain mediums capable of lasing 102, such as a first gain medium 116 through an Nth gain medium 118, may exist in the planar light circuit 100. Each gain medium 102 supplies an optical signal having a narrow band of wavelengths (λ) different than the other gain mediums. Each of the gain mediums 102 couples to it's own port on the multiplexer/demultiplexer 112. The broadband wavelength reflector 106 couples to the output of the multiplexer/demultiplexer 112. The wavelength reflector 106 routes a portion of each optical signal as regenerative feedback through the multiplexer/demultiplexer 112 to the gain medium 102 that supplied the optical signal.

The modulation source 108 may supply a data signal to the gain medium array 102 to directly modulate the gain mediums in that array. The electrical modulation source 108, by directly supplying the data to a particular gain medium, directly modulates that gain mediums capable of lasing. For example, the modulation source 108 may directly modulate the first gain medium capable of lasing 116. The data signal is amplified by the first gain medium capable of lasing 116 at a band of wavelengths around approximately one or more of its cavity modes. The first gain medium capable of lasing 116 routes the modulated signal to a first input 120 of the multiplexer/demultiplexer 112.

The multiplexer/demultiplexer 112 routes the modulated signal to the wavelength reflector 106. The wavelength reflector 106 routes a portion of the modulated signal as regenerative feedback back through the multiplexer/demultiplexer 112 to the first gain medium capable of lasing 116 that supplied that modulated signal. The modulated signal and the reflected portion of the modulated signal reinforce each other, in phase, at a resonant frequency of the first gain medium capable of lasing 116. The modulated signal and the reflected portion of the modulated signal are also amplified by the first gain medium capable of lasing 116.

The first gain medium capable of lasing 116 then transmits the reinforced modulated signal through the multiplexer/demultiplexer 112 and a portion of that reinforced modulated signal passes through the wavelength reflector 106 to the connection 110 to the output fiber. Also, as described above, the wavelength reflector 106 reflects a portion of that reinforced modulated signal back through the multiplexer/demultiplexer 112 to the first gain medium. This regenerative amplification of a narrow band occurs for each of the gain mediums capable of lasing 102. Each of the gain mediums capable of lasing 102 amplifying its own distinct narrow band of wavelengths.

The multiplexer/demultiplexer 112 acts as a narrow band filter to define the band of wavelength developed by the first gain medium capable of lasing 116. A natural characteristic of the multiplexer/demultiplexer 112 is to pass a different band of wavelengths on each of its outputs. For example, the first output may pass the band of wavelengths from 1530 to 1531 nanometers (nm). The second output may pass the band of wavelengths from 1531 to 1532 nm. Therefore, the multiplexer/demultiplexer 112 creates a narrow band of wavelengths supplied back to each gain medium capable of lasing 102. Accordingly, each gain medium capable of lasing 102 develops and amplifies a resonant wavelength within that band of wavelengths corresponding to a cavity mode of the gain medium. When the amplified band of wavelengths is reinforced with the reflected modulated signal, then the gain medium generates an optical signal of sufficient power to transmit over the passive optical network to a subscriber's home. The reflected modulated signal provides resonant feedback to the gain medium capable of lasing.

The array of gain mediums capable of lasing 102, the multiplexer/demultiplexer 112, the optical amplifier 104, and the broadband wavelength reflector 106 can all be integrated into a single integrated unit. The integral unit may be a single substrate where all the components are grown on that single substrate. Alternatively, the integral unit may be two or more substrates made out of different materials and physically joined together.

The integral unit may use optical couplings 122 other than optical fibers in the optical path of the integral unit, such as air, lens arrays, or other such waveguides. Optical fibers typically require minimum bend radiuses and have other disadvantages that do not allow them to be used in a small compact space. However, optical couplings 122 other than optical fibers such as air or lens arrays may be used in a very small physical space to allow the communication of optical signals from one optical component to the next optical component. Further, in an integral unit where all of the gain mediums capable of lasing 102 are grown on the same substrate, the physical spacing between the gain mediums may be much shorter and smaller in physical size than if each of the gain mediums capable of lasing 102 was a fabricated as a discrete component and placed onto a common platform.

The substrate may be composed of Indium-Phosphide, where both active devices, such as the gain mediums capable of lasing, optical amplifiers, and modulators, can be integrated along with passive devices, such as the wave-guides and multiplexer/demultiplexer. The substrate may also be composed from other materials, such as erbium-doped silica.

The array of gain mediums capable of lasing 102 may contain a large number of lasers, such as thirty-two or sixty-four lasers, acting as gain mediums, however the gain medium array may be as small as four or so laser sources acting as gain mediums capable of lasing. The optical gain medium capable of lasing may be a distributed feed back laser having its center wavelength set by a Bragg grating, a Fabry Perot laser diode, reflective semiconductor optical amplifiers, or similar laser grown on a single substrate. Each of the gain mediums capable of lasing has its own resonant wavelength and may be biased to operate above or below a lasing threshold.

The reflective semiconductor optical amplifiers may be gain mediums capable of lasing that have a highly reflective back facet, such as 90%, with a front facet surface that is at a non-normal angle/non-perpendicular angle to the optical waveguide of the reflective semiconductor optical amplifier. The highly reflective back facet causes a greater amount of the injected wavelengths to be amplified and reflected back out of the reflective semiconductor optical amplifier. The front facet waveguide at a non-normal angle reduces the front facet reflectivity and allows a greater amount of gain to be provided by the reflective semiconductor optical amplifier before lasing action occurs in the reflective semiconductor optical amplifier on the injected wavelengths.

The optical amplifier 104 coupled to the multiplexer/demultiplexer 112 may amplify the optical signal coming from the multiplexer/demultiplexer 112 to increase the overall gain and compensate for any insertion losses. A connection 110 to an output fiber exists in the output optical path of the multiplexer/demultiplexer 112 to a passive optical network. The passive optical network may have an optical splitting component such as a wave division multiplexer.

The gain mediums capable of lasing may be also continuous wave sources modulated by a separate array of modulators rather than directly modulated. Each continuous wave modulator connects to its own gain medium. The continuous wave modulator data modulates the continuous wave coming from the gain medium capable of lasing. The multiplexer/demultiplexer 112 may be an array wave-guide, an eschelle grating, or other similar technique to combine multiple unique wavelengths into a single wave-guide with a low signal power loss.

The wavelength reflector 106 may also be located at the output of the planar lightwave circuit 100 to provide regenerative optical feedback to each gain medium capable of lasing 102 in order to develop the resonant wavelength of that gain medium. The wavelength reflector 106 may be created by etching a vertical facet in the wave guide to create a change in the index of refraction, or be a Bragg grating, or maybe a coating at the edge of the substrate of the integral unit/interface with the output optical fiber with a reflective material to reflect a portion of the optical signal back to the multiplexer/demultiplexer 112, or may be a grating at the entrance of the optical fiber 114 pigtailed to the planar lightwave circuit 100.

The construction of the planar lightwave circuit 100 having an array of gain mediums capable of lasing resembles a distributed laser having an external cavity which can operate above or below the lasing threshold in order to develop or reinforce a multiple bands of wavelengths each having different wavelength bands. Thus, the construction of the distributed laser may be defined as from the gain mediums capable of lasing section through the multiplexer/demultiplexer 112 to the wavelength reflector 106 and back through the multiplexer/demultiplexer 112 to each gain medium section. Each laser in the gain medium section may or may not have a reflective front facet.

Figure 2:
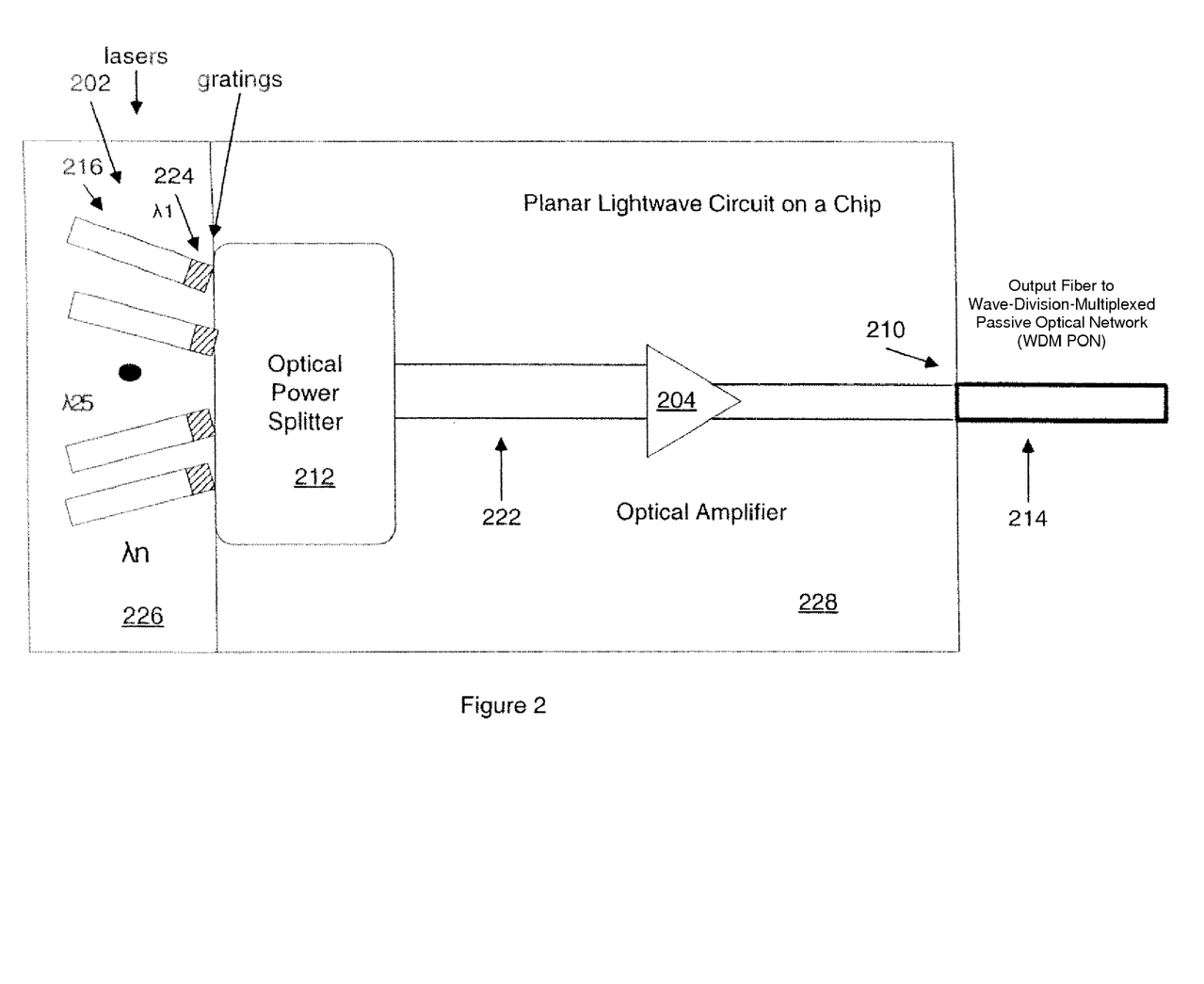
FIG. 2 illustrates a block diagram of an embodiment of an array of four or more distributed feedback lasers in an integral unit. The array of four or more distributed feedback lasers 202 each coupled to a power splitter 212.

FIG. 2 illustrates a block diagram of an embodiment of an array of four or more distributed feedback lasers in an integral unit. The array of four or more distributed feedback lasers 202 each coupled to a power splitter 212. Each distributed feedback laser in the array 202 supplies a separate optical signal containing a band of wavelengths different than the other distributed feedback lasers in that array to the power splitter. Each distributed feedback laser in the array 202 has it's center wavelength of that band of wavelengths set by a Bragg grating at the output of the distributed feedback laser. For example, the first distributed feedback laser 216 has the center wavelength of the band of wavelengths supplied from the laser set by the first Bragg grating 224 intermixed with the gain medium of the first distributed feedback laser 216. A semiconductor optical amplifier 204 may exist in an output optical path of the power splitter 212 to make up for the insertion losses caused by the power splitter 212. A connection 210 exists for an output fiber to route the optical signal from the power splitter 212 or at least in the output optical path of the power splitter 212 to a wave-division-multiplexed passive optical network. The array of distributed feedback lasers 202 may be integrated onto a first substrate 226. The semiconductor optical amplifier 204, the power splitter 212, and the connection 210 may be integrated into a second substrate 228 that is joined to the first substrate 226 and that communicates optical signals in the optical path between the first substrate and the second substrate using optical couplings 222 such as air or lens arrays but not using optical fibers.

Thus, the active components may be fabricated on a first substrate 226 and the passive components may be fabricated on a second substrate 228 that are merged and physically joined together into an integral unit. The first substrate 226 as discussed may be silicon dioxide, indium phosphide, or similar substrate. Note, Distributed Bragg Reflector lasers, for example, can also be used to generate the optical signal containing the band of wavelengths instead of the distributed feedback lasers. The Distributed Bragg Reflector lasers may have Bragg grating at the output of the laser to set the center wavelength of that laser.

Figure 3:
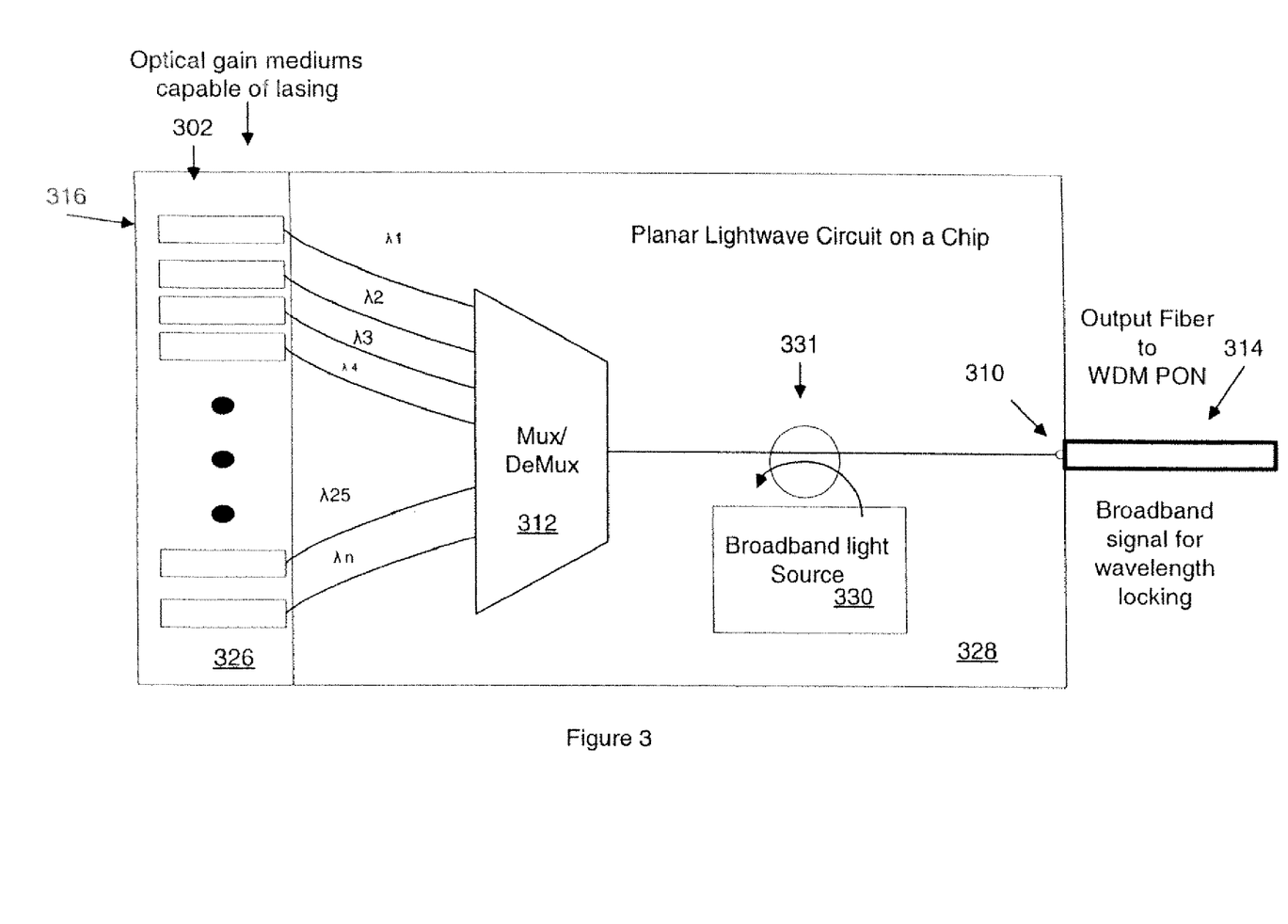
FIG. 3 illustrates a block diagram of an embodiment of an array of lasers and a broadband light source to supply an optical signal to each of the lasers all contained in an integral unit.

FIG. 3 illustrates a block diagram of an embodiment of an array of lasers and a broadband light source to supply an optical signal to each of the lasers all contained in an integral unit. The integral unit may contain an array of four or more lasers such as Fabry-Perot laser diodes 302 on a first substrate 326. The integral unit may contain a second substrate 328 containing a multiplexer/demultiplexer 312, a broadband light source 330, and a connection 310.

The broadband light source 330 supplies an optical signal containing a broad band of wavelengths, such as the C-band (1530 nm 18 1560 nm), through an optical coupler 331 to the multiplexer/demultiplexer 312. Each of the Fabry-Perot laser diodes in the array 302 couples to it's own port on the multiplexer/demultiplexer 312. Each of the Fabry-Perot laser diodes in the array 302 receives a spectral slice of the optical signal from the broadband light source 330 in order to wavelength lock an output wavelength of that Fabry-Perot laser diode to within the bandwidth of the injected spectral slice. For example, the first Fabry-Perot laser diode 316 may receive a spectral slice of 1530 to 1531 nm. The first Fabry-Perot laser diode 316 then may reflect and amplify the spectral slice back out through the multiplexer/demultiplexer 312 to the connection 310. The connection 310 couples to an output fiber 314 in order to route an optical signal to the wavelength division multiplexing passive optical network.

All of the Fabry-Perot laser diodes in the array 302, the multiplexer/demultiplexer 312, the connection 310, and the broadband light source 330 are integrated into a compact integral unit. The broadband light source 330 may also be discrete from the integral unit. The broadband light source 330 may consist of two or more super luminescent diodes connected to supply orthogonal polarized signals, an erbium fiber that acts as a broadband light source, an erbium doped waveguide, a single super luminescent diodes connected to the integral unit with polarization perservering fiber, a single on chip super luminescent diode, or other similar light emitting source. All of the components may be located in a single planar lightwave circuit.

Figure 4:
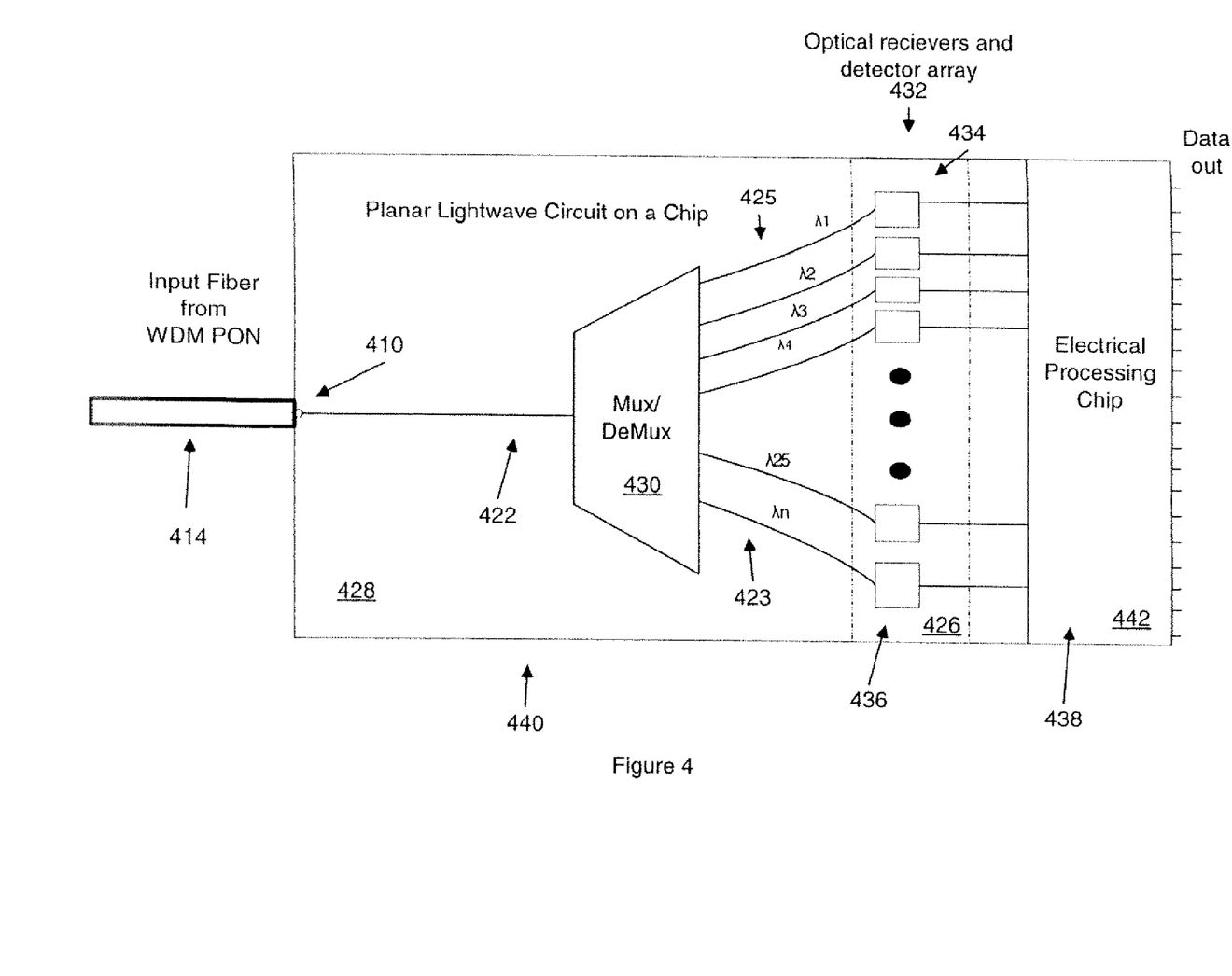
FIG. 4 illustrates a block diagram of an embodiment of an array of four or more optical receivers and a multiplexer/demultiplexer integrated in to a single integral unit.

FIG. 4 illustrates a block diagram of an embodiment of an array of four or more optical receivers and a multiplexer/demultiplexer integrated in to a single integral unit. The integral unit may contain an array of four or more optical receivers 432, such as a first optical receiver 434 through an Nth optical receiver 436, an electrical processing chip 438 to process the received data signals $\lambda 1$ through $\lambda n$, a multiplexer/demultiplexer 430, and a connection 410 to receive an input fiber from a wave-division-multiplexed passive optical network having a component to combine multiple optical signals coming from subscribers of that passive optical network. Each of the optical receivers in the array 432 may contain one or more photo detectors.

The integral unit containing the receivers 440 may be located at the central office where returning signals need to be locally processed. Note, the integral unit of the optical gain mediums capable of lasing may also be located at the central office where minimizing the space occupied by components is at a premium and all of the components may be compactly, centrally located. The first substrate 426 having the optical receivers array 432 may be composed of indium phosphide, gallium arsenide, silicon, or other similar semiconductor substrates. The first substrate 426 may be coupled in a planar lightwave circuit to the multiplexer/demultiplexer 430 on the second substrate 428. The electrical processing chip 438 containing the electrical processing components that process the signal from the optical receivers in the array 432 can also be on another third substrate 442 made of silicon. The third substrate 442 may be coupled and physically joined to the first substrate 426. The substrates 426, 428 in the integral unit may communicate optical signals via wave-guides without optical fibers, such as the first non-optical fiber waveguide 422, the second non-optical fiber waveguide 423, and the third non-optical fiber waveguide 425. All of the substrates 426, 428, 442 may be fabricated as a single integral unit 440.

Figure 5:
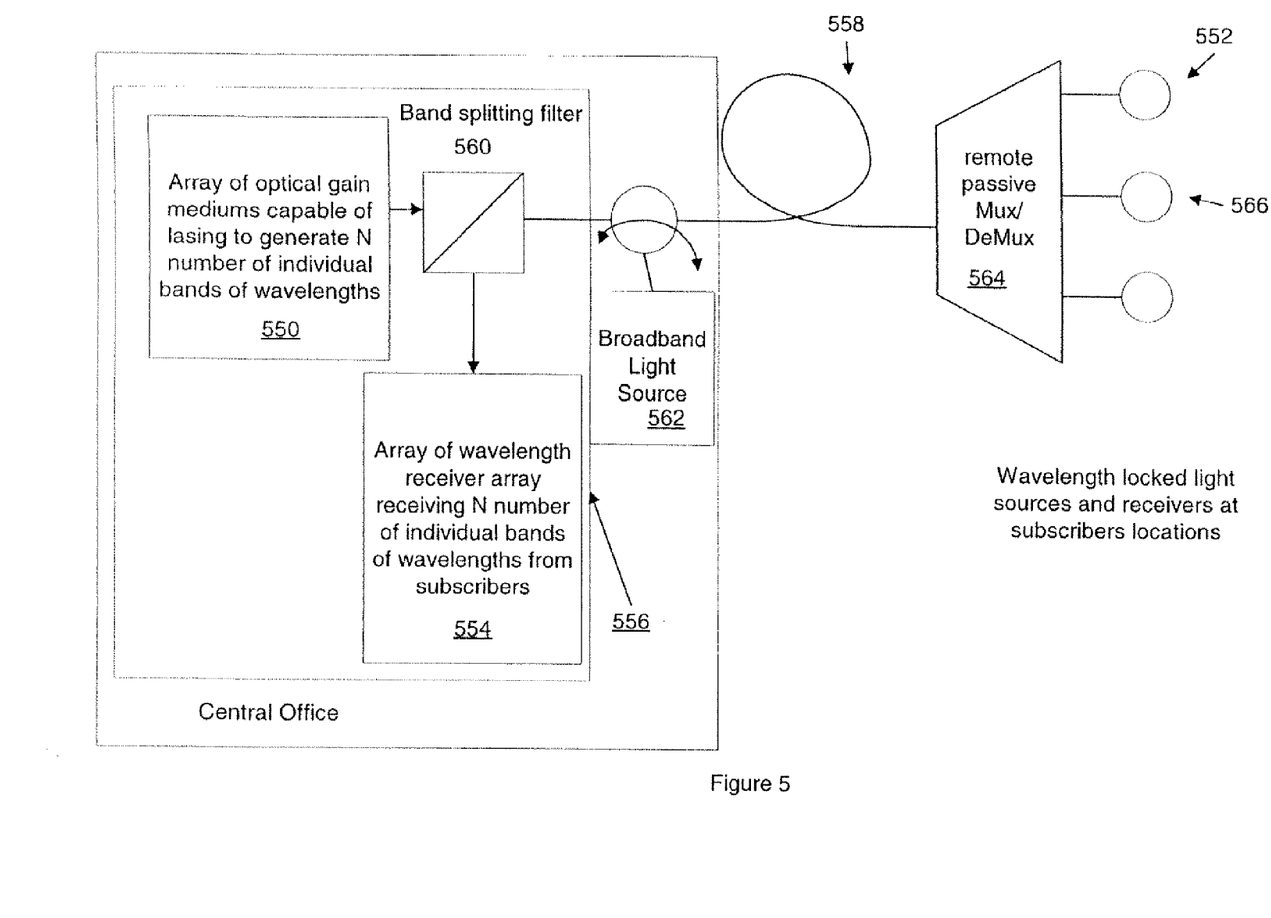
FIG. 5 illustrates a block diagram of an embodiment of an array of optical gain mediums capable of lasing and an array of optical receivers contained within an integral unit.

FIG. 5 illustrates a block diagram of an embodiment of an array of optical gain mediums capable of lasing and an array of optical receivers contained within an integral unit. The array of optical gain mediums capable of lasing 550 may generate N number of individual bands of wavelengths. Each optical gain medium capable of lasing communicates an optical signal across the passive optical network to a corresponding subscriber, such as the first subscriber location 552. The array of optical receivers 554 may receive N number of individual bands of wavelengths from those subscribers. For example, a first receiver may receive an optical signal generated from the first subscriber location 552. The array of optical receivers 554 may include the same number of receivers as gain mediums capable of lasing in the array of gain mediums capable of lasing. For example, a first array of optical receivers 554 may contain thirty-two receivers and a first array of gain mediums capable of lasing may contain thirty-two gain mediums capable of lasing. The array of optical gain mediums capable of lasing 550 and the array of optical receivers 554 may be on a single substrate or may be on separate substrates joined to each other in the integral unit 556.

Each of the arrays 550, 554 may contain a multiplexer/demultiplexer or a power splitter to distribute the signals coming from and going to the passive optical network 558. On each of the arrays 550, 554, the components may be grown on that substrate to make the spacing between individual components as small as possible. The integral unit 556 may also contain a band splitting filter 560 and a broadband light source. The broadband light source 562 may also be exterior to the integral unit 556.

The broadband light source supplies an optical signal containing a broadband of wavelengths, such as the L-band, to the multiplexer/demultiplexer in the optical gain medium array 550. As discussed above, the multiplexer/demultiplexer routes a narrow band optical signals to each of the optical gain medium in the array 550 to wavelength lock the output wavelength of the optical gain medium capable of lasing within the bandwidth of the injected spectral slice.

The array of optical gain mediums capable of lasing 550 through its multiplexer/demultiplexer may send a single optical signal consisting of, for example, thirty-two individual bands of wavelengths contained within the C-band across the passive optical network 558 to a remote multiplexer/demultiplexer 564. The remote multiplexer/demultiplexer 564 may distribute the individual band of wavelengths from each optical gain mediums capable of lasing in the array 550 to a corresponding subscriber location. For example, the remote multiplexer/demultiplexer 564 may distribute the band of wavelengths from the second optical gain medium capable of lasing to the location of a second subscriber 566. The remote multiplexer/demultiplexer 564 may distribute all of the N number of individual band of wavelengths from the array of optical gain mediums capable of lasing 550 in this manner to corresponding subscriber locations.

The group of users/subscribers may also transmit optical signals back to the array of receivers 554 in central office in the L-band (1570 nm ~1600 nm). The band-splitting filter 560 separates the L-band wavelengths from the C-band wavelengths. The band-splitting filter 560 routes the L-band signals to the array of optical receivers 554 and the C-band wavelengths from the broad light source to the array of optical gain mediums capable of lasing 550.

The transmitters in the central officer may use a first band such as the L-band to communicate information to subscribers and the transmitters at the subscribers use another band such as the C-band to communicate information to the central office. Accordingly, the optical gain mediums capable of lasing may generate individual optical signals in different band of wavelengths such as the O-band (around 1300 nm), S-band (around 1480 nm), etc.

A second multiplexer/demultiplexer in the optical receiver array 554 routes individual signals in the C-band to each of the corresponding optical receivers. Each of the optical receivers receives a separate signal containing a band of wavelengths different than the other optical receivers in the array 554. The array of optical gain mediums capable of lasing 550 and the array of optical receivers 554 may be positioned at set angles such as approximately 90 degrees and approximately 180 degrees with respect to the band splitting filter 560 to route optical signals with waveguides, lenses or in air and without using optical fibers.

Figure 6:
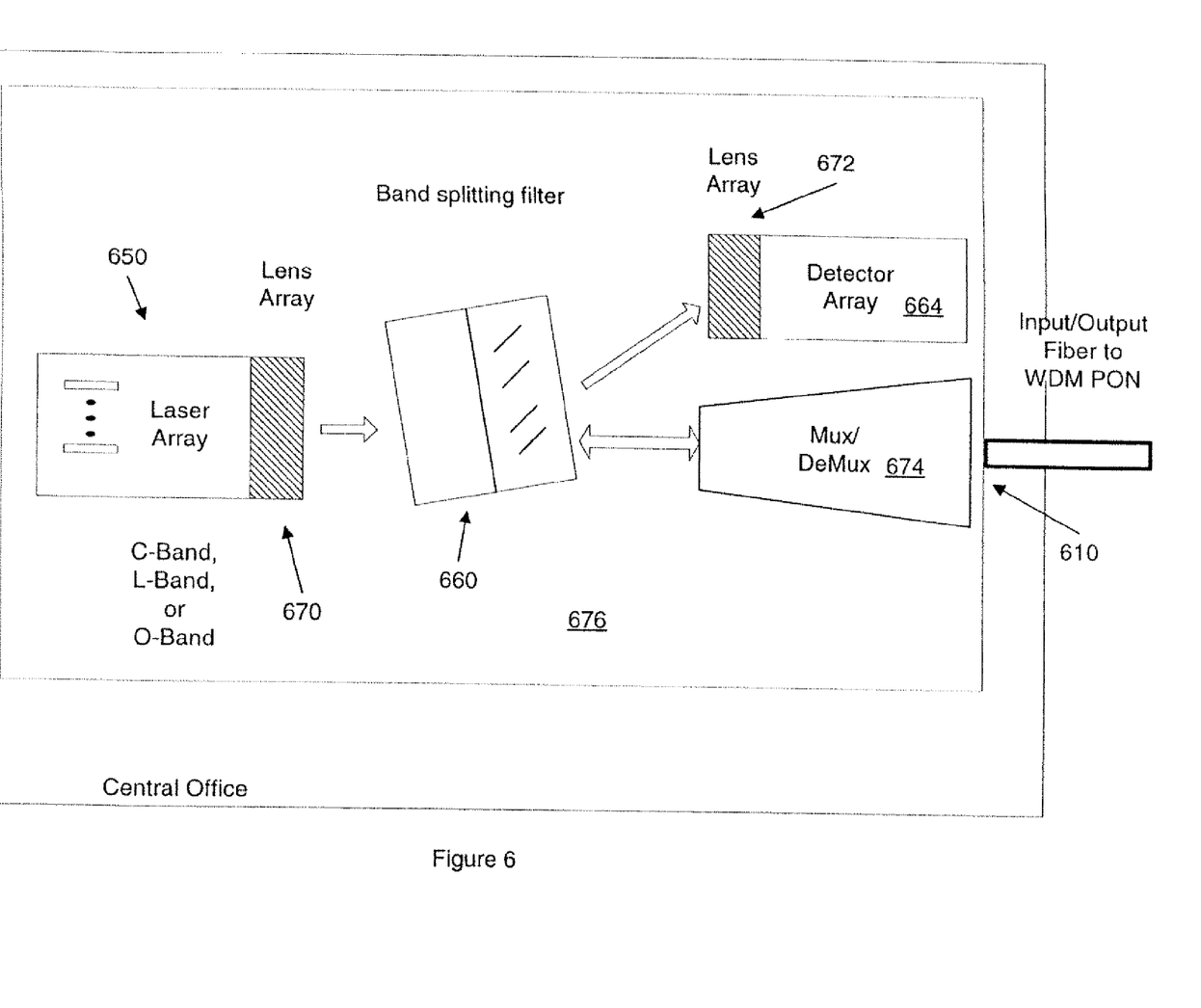
FIG. 6 illustrates a block diagram of an embodiment of an array of lasers and an array of optical receivers in an integral unit.

FIG. 6 illustrates a block diagram of an embodiment of an array of lasers and an array of optical receivers in an integral unit. The array of lasers 650 and the array of receivers 664 may each couple to a lens array 670, 672. The integral unit 676 may contain the array of lasers 650, a band splitting filter 660, a multiplexer/demultiplexer 674, the array of optical receivers 664, a first lens array 670, a second lens array 672, and a connection 610 to a passive optical network. The multiplexer/demultiplexer 674 routes signals to and from the array of receivers 664 and the array of lasers 650. The multiplexer/demultiplexer 674 routes signals back and forth from the passive optical network. The array of optical receivers 664 is put close to the multiplexer/demultiplexer 674 so that the angle of the reflected C-band wavelengths from the band splitting filter 660 remains at a small angle. The array of optical receivers 664 may be positioned at set angles such as 45 degrees or less to route optical signals with air and the second lens array 672. The band splitting filter 660 coated with a standard dielectric coating may split different wavelength bands such as the C-band wavelengths and the L-band wavelengths.

The fabrication of the array of optical receivers and lasers in a single integral unit may be accomplished in a more simple fashion by using a band-splitting filter reflecting optical signals to the arrays at a small angle. If the laser array is operated in the O-band, around 1300 nanometers, rather than the L-band, then the reflected angle may be about 90° which can make the packaging easier by using a beam splitting prism. All of the configurations described above may be integrated into a passive optical network. The passive optical network may or may not wavelength lock gain mediums capable of lasing by injecting a narrow band Amplified Spontaneous Emission light into laser diodes acting as gain mediums capable of lasing.

In the foregoing specification, the invention has been described with reference to specific exemplary embodiments thereof. It will, however, be evident that various modifications and changes may be made thereto without departing from the broader spirit and scope of the invention as set fourth in the appended claims. The specification and drawings are, accordingly, to be regarded in an illustration rather then a restrictive sense.

We claim:

1. An apparatus, comprising:
   an array of lasers, each laser to supply a separate optical signal containing a band of wavelengths different than other lasers in the array;
   an optical power splitter coupled to the array; and
   a connection for an output fiber to route a first optical signal in an output optical path of the optical power splitter to a passive optical network, wherein the array of lasers, the optical power splitter, and the connection are integrated into an integral unit.

2. An apparatus as in claim 1, wherein at least one laser of the array of laser is has its center wavelength set by a Bragg grating.

3. An apparatus as in claim 1, further comprising
   a semiconductor optical amplifier in an output optical path of the power splitter.

4. An apparatus as in claim 1, wherein the array of lasers is on a first substrate, and the optical power splitter and the connection are on a second substrate.

5. A method, comprising:
   supplying first bands of wavelengths from an array of lasers to a power splitter, wherein a laser in the array supplies a separate optical signal containing a band of wavelengths different than other lasers in the array, to provide an output optical signal; and
   routing the output optical signal to a wave-division-multiplexed passive optical network.

6. A method as in claim 5, further comprising
   amplifying the output optical signal.

7. A method as in claim 5, wherein the array of lasers is on a first substrate, and the power splitter is on a second substrate.

8. A method as claim 5, further comprising
   communicating the optical signal over an optical coupling other than an optical fiber.

9. A method as in claim 5, wherein at least one wavelength of the first bands of wavelengths is set by a Bragg grating at an output of the laser.

* * * * *